United States Patent [19]

Simpkins et al.

[11] Patent Number: 5,431,569
[45] Date of Patent: Jul. 11, 1995

[54] COMPUTER INTERACTIVE MOTION SIMULATOR

[76] Inventors: Terry J. Simpkins; R. Kelly Simpkins, both of 3042 Highland Dr., Carlsbad San Diego County, Calif. 92008; T. J. Simpkins, Jr., 2270 La Costa Ave. #, Carlsbad San Diego County, Calif. 92009; Rob King, 1580 Shadowridge Dr. #, Vista San Diego County, Calif. 92083

[21] Appl. No.: 112,525

[22] Filed: Aug. 27, 1993

[51] Int. Cl.⁶ .............................................. G09B 9/02
[52] U.S. Cl. ....................................... 434/29; 434/59
[58] Field of Search .................... 434/29, 30, 33, 34, 434/35, 38, 39, 43, 45, 59, 62, 70, 71; 472/60

[56] References Cited

U.S. PATENT DOCUMENTS

| | | | |
|---|---|---|---|
| 2,591,752 | 4/1952 | Wicklund | 434/38 |
| 3,449,843 | 6/1969 | Richter et al. | 434/34 |
| 4,461,470 | 7/1984 | Astroth | 272/17 |
| 4,478,407 | 10/1984 | Manabe | 272/18 |
| 4,630,817 | 12/1986 | Buckley | 272/73 |
| 4,710,128 | 12/1987 | Wachsmuth | 434/59 |
| 4,711,447 | 12/1987 | Mansfield | 272/73 |
| 4,856,771 | 8/1989 | Nelson | 272/18 |
| 5,054,771 | 10/1991 | Mansfield | 272/73 |
| 5,129,826 | 7/1992 | Munsch | 434/33 |
| 5,252,068 | 10/1993 | Gryder | 434/30 |
| 5,275,565 | 1/1994 | Moncrief | 434/29 |

Primary Examiner—John G. Weiss
Attorney, Agent, or Firm—Terry M. Gernstein

[57] ABSTRACT

A motion simulator uses an existing personal computer and off the shelf software to physically simulate and control the motions of a computer generated vehicle. The motion simulator is manually powered by the user and includes a control stick connected to an input to the computer whereby movement of the control stick is translated into movement of the computer generated vehicle. A rigid control arm connects the control stick to a base unit and to a cockpit frame to move the cockpit frame relative to the base unit as the control stick is moved. The control stick also contains buttons which provide additional inputs to the computer generated vehicle. Foot operated pedals are also connected to the computer program and to the cockpit to move the cockpit in conjunction with movement of a computer generated vehicle. A throttle lever unit is also connected to the computer to control the computer generated vehicle. The center of gravity of the cockpit is located below the pitch and roll axis so the cockpit tends to return to an initial position. Gravity assists the cockpit and control stick in resisting movement whereby realism is added to the simulation. A trim adjusting wheel moves the seat unit fore and aft to adjust center of gravity of the cockpit frame to position the cockpit frame in a pitch up or pitch down position. A releasable parking mechanism securing the cockpit frame to the base unit immobilizes the simulator for safe boarding. A speaker bracket on the seat unit provides a place to mount stereo speakers for added realism.

19 Claims, 12 Drawing Sheets

COMPUTER INTERACTIVE MOTION SIMULATOR

TECHNICAL FIELD OF THE INVENTION

The present invention relates to the general art of motion simulators, and to the particular field of motion simulators that are used in conjunction with a computer to physically simulate the action occurring on the computer.

BACKGROUND OF THE INVENTION

The field of computer simulated action programs has expanded rapidly in recent times. While the most visible manifestation of this expansion is in computer games, this expansion has also occurred in the field of flight training and flight simulation for pilots, and vehicle operators of all sorts. A pilot can run through an entire flight without actually entering an airplane. This process has been used to train military pilots as well as civilian pilots.

One requirement of such simulators is realism. That is, when the vehicle operator instructs the vehicle to execute a particular maneuver, that operator should physically feel the effects of the maneuver as well as visually see the effects on the computer screen. In this manner, the simulator will more closely reflect actual physical conditions so the vehicle operator will receive physically responsive training.

In the case of an airplane, for example, in actual flight a pilot will be subjected to movements in a plurality of planes, including pitch, roll, and yaw or x-plane, y-plane and z-plane movement. In order to simulate actual physical conditions, a simulator should subject the pilot to the sensation that he or she is moving in all of these planes.

The manual motion simulator becomes available to the home market through the utilization of the owners home computer and off the shelf game and simulation software. Currently motion simulation is not available to the home market since current motion simulators require dedicated or on board computers, dedicated software, and powered motion.

OBJECTS OF THE INVENTION

It is a main object of the present invention to provide a motion simulator that will cooperate with an existing personal computer and off the shelf software to physically simulate and control the motions of a computer generated vehicle. This will realistically simulate physical movements associated with vehicle movements generated by the computer.

It is another object of the present invention to provide a motion simulator that does not use any external power. All motion is manually powered by the user.

It is another object of the present invention to provide a motion simulator that can be safely operated by a novice.

It is a more specific object of the present invention to provide a motion simulator that simulates the movement of an airplane.

SUMMARY OF THE INVENTION

These, and other, objects are achieved by a motion simulator that has movement in multiple planes, including the pitch, roll, and yaw planes, yet will attempt to return to a predetermined orientation whereby resistance to such movements is realistic. The motion simulator is balanced and arranged so the center of gravity acts on a cockpit frame of the simulator to produce the required resistance to movement, bringing the cockpit frame back to its starting position. This will thereby produce realistic action for a user. Furthermore, the cockpit frame is connected, through the control stick, to the stationary frame by means of a rigid control arm. Therefore, movement of the control stick causes corresponding movement of the cockpit frame. The input device that controls the computer program is connected to the control stick. Thus, movement of the control stick moves the cockpit frame in conjunction with the control of the computer program. This movement realistically simulates actual movements of a vehicle, such as an airplane, a helicopter, or a land vehicle.

The motion simulator of the present invention is interactive for whole body movement. Roll, pitch, yaw, and pitch trim induces real sensations in that the user experiences motions that are displayed on the screen of a computer. A feedback capability in the controls and movements have a realistic feel and are self-centering. The motion simulator has the capability to interact with a wide range of software.

BRIEF DESCRIPTION OF THE DRAWING FIGURES

FIGS. 8A–8C, 9A–9C, and 10A–10C show various positions of the cockpit frame.

DETAILED DESCRIPTION OF THE PREFERRED EMBODIMENT OF THE INVENTION

Shown in FIGS. 1, 2, 3, 8A is a vehicle motion simulator 10 embodying the present invention. The simulator 10 is connected to a computer and simulates physical movement associated with movements of a vehicle, such as an airplane, a helicopter, and a land or water vehicle which is depicted on a computer monitor 13. The computer uses readily available software and is connected to the simulator 10 via an electronic cable 11. Simulator 10 incorporates motion known from such disclosures as U.S. Pat. Nos. 5,054,771, 4,461,470 and 4,478,407, the disclosures of which are incorporated herein.

The simulator 10 permits a user 14 to realistically experience the vehicle movements being depicted on the computer screen. Such movements include pitching, rolling, and yawing motions as well as optional vertical movements that generate g-forces. The simulator will be disclosed in connection with a flight simulator program, but could be used in conjunction with any vehicle program. As mentioned above, the simulator 10 includes means for simulating resistance and return forces that match those found in an actual airplane whereby realistic simulation is afforded by simulator 10.

Figures 1, 1A:
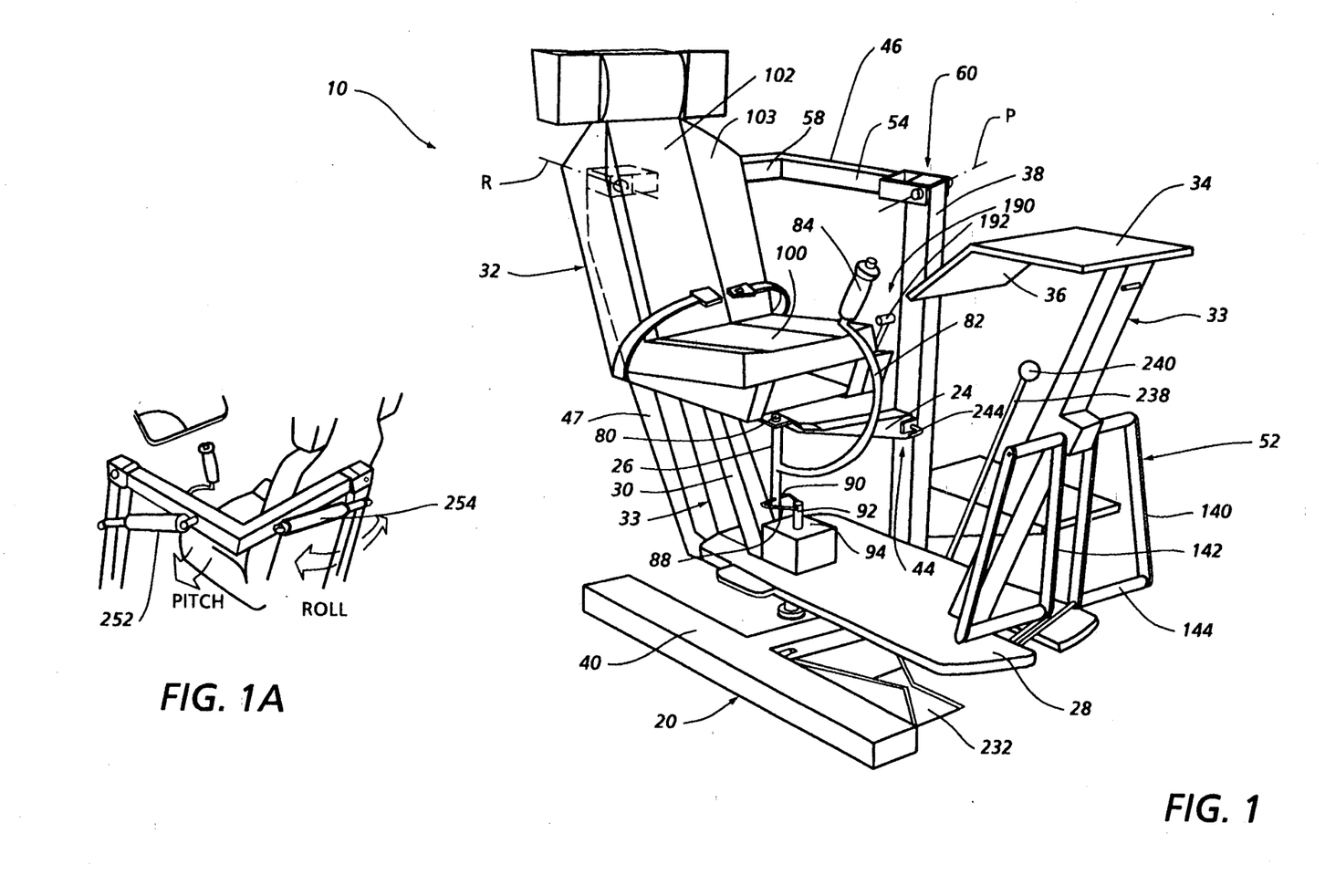
FIG. 1 is a front, side and top perspective view of the flight motion simulator embodying the present invention.
FIG. 1A is a perspective view showing optional pitch and roll shock absorbers connecting the pitch frame to a stanchion and to a roll frame respectively.
Figure 2:
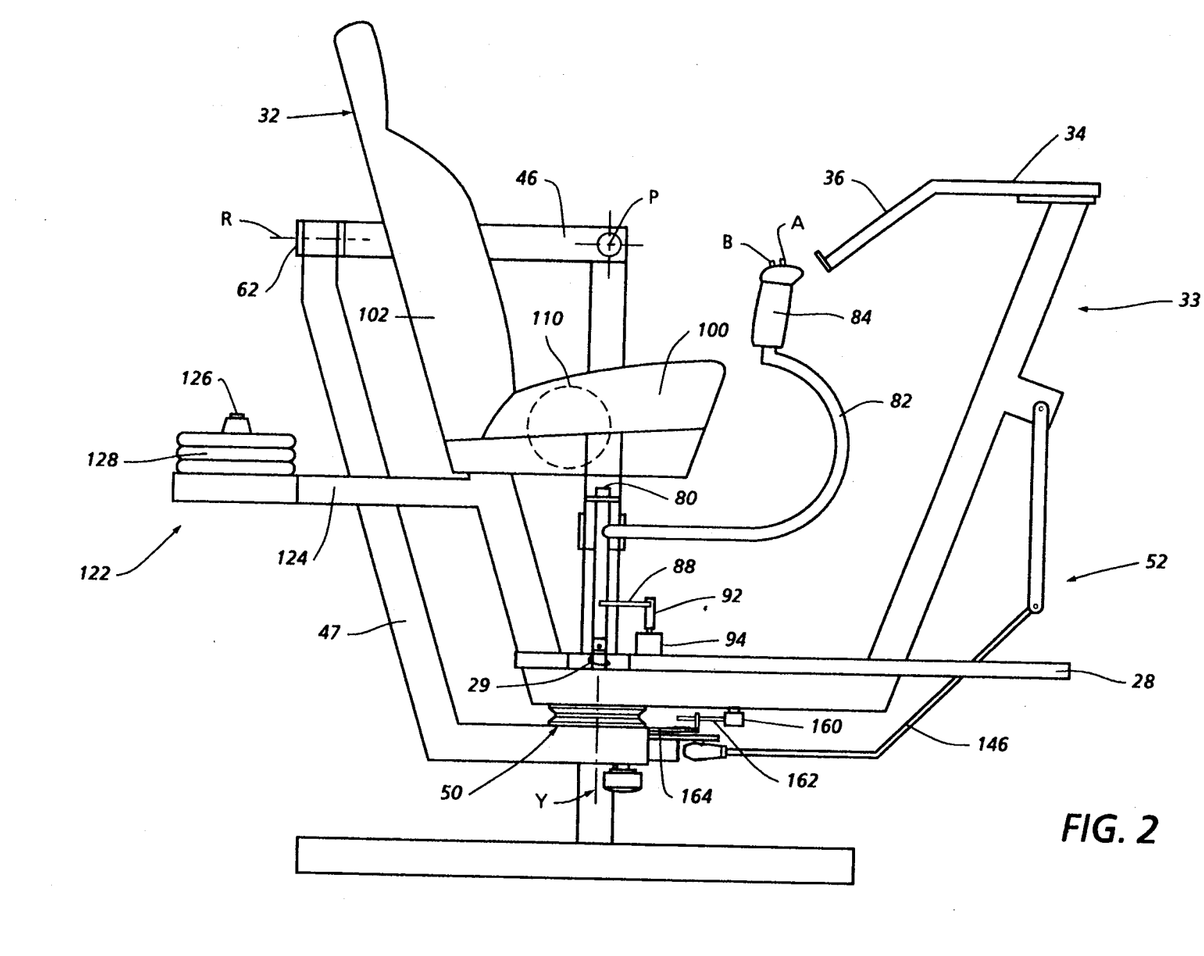
FIG. 2 is a side elevation view of the flight motion simulator.
Figure 3:
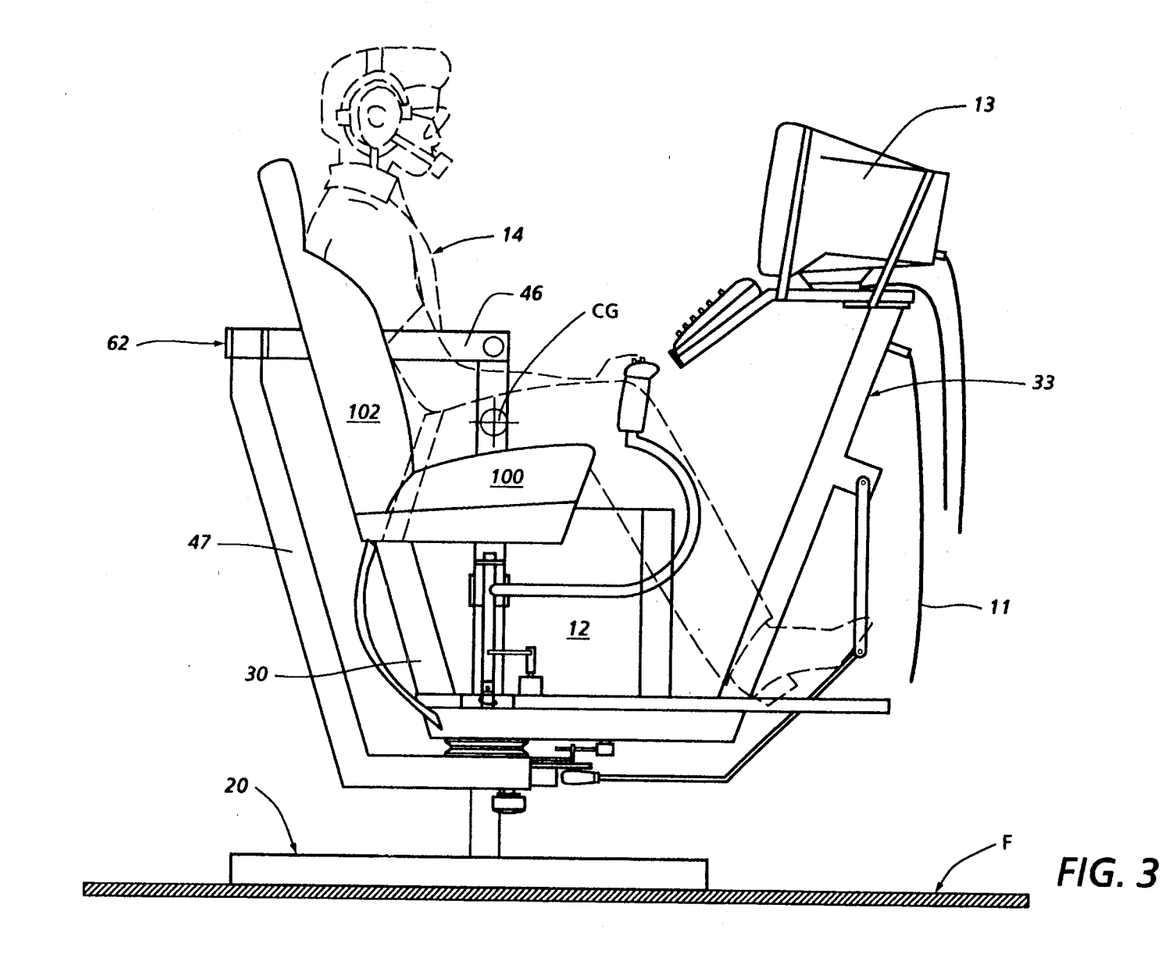
FIG. 3 is a side elevation in which the user and computer components are included.
Figures 5, 5A:
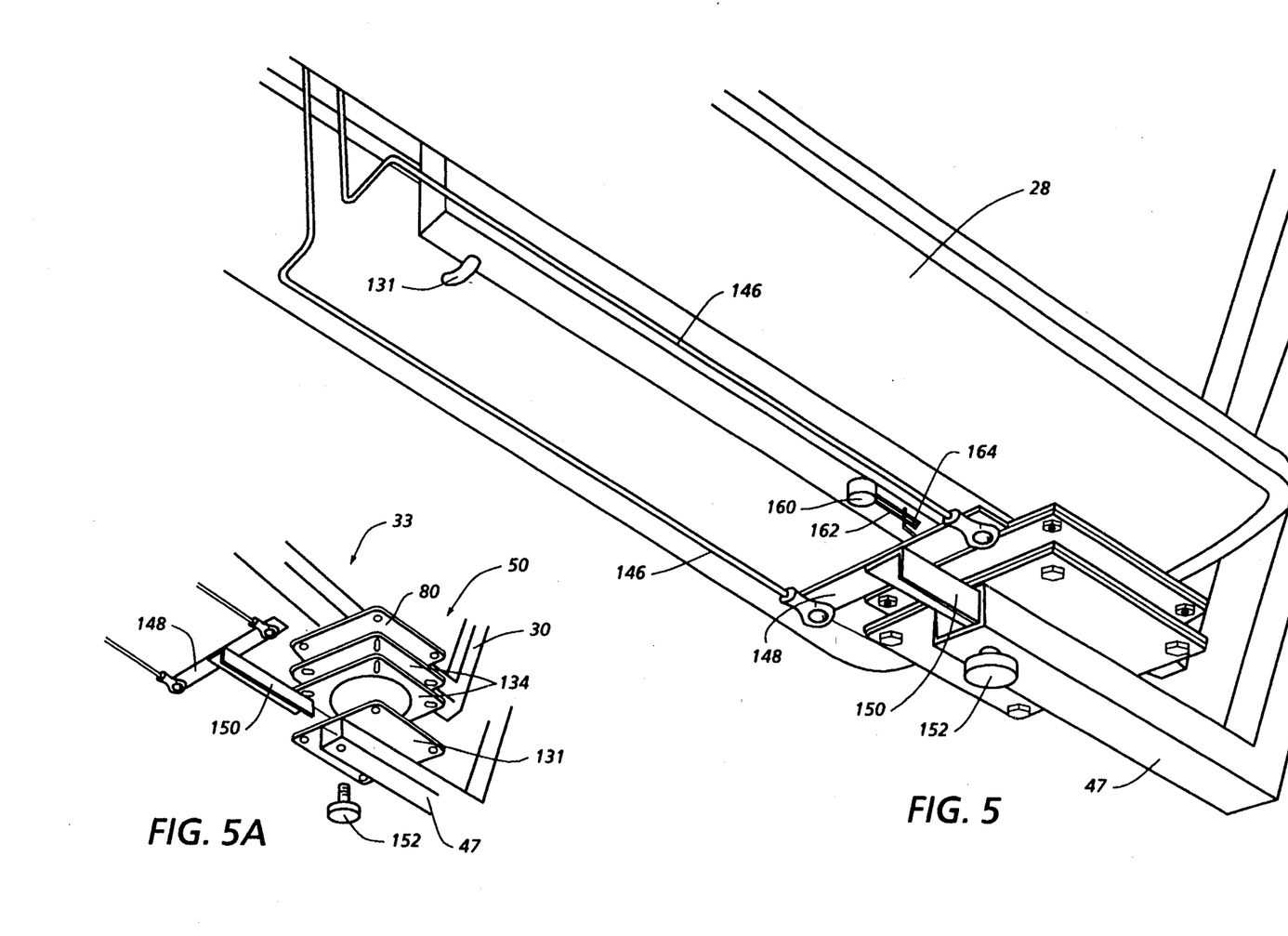
FIG. 5 is an underside view of the cockpit frame.
FIG. 5A is an exploded perspective view of the yaw pivot that connects the U-shaped cockpit frame to the L-shaped roll frame to permit yaw movement of the cockpit frame.

Broadly, the simulator 10 includes a base frame unit 20 which rests on a supporting surface, such as a floor F as shown in FIG. 3. The base frame unit 20 is connected, by way of a rigid control arm 24 as shown in FIG. 1, universally to the distal end of the control stick 26. The proximal end of the control stick is connected to the cockpit frame unit 33 by a universal joint 29 as shown in FIG. 2. As can be seen in FIGS. 1 and 2, seat support frame 30 is one leg of the U-shaped cockpit frame 33, with the computer monitor platform 34 being mounted on the forward leg of the U-shaped cockpit frame 33. A keyboard support 36 is mounted on the platform 34. The U-shaped cockpit frame 33 includes a plate 130 which is located on the bottom side of the U-shaped cockpit frame, as shown in FIG. 5A.

More specifically, the base frame unit 20 includes a vertically oriented stanchion 38 having the lower end fixedly connected to a T-shaped base unit 40 and extending upwardly therefrom to have an upper end spaced above the floor as shown in FIGS. 1 and 2. The rigid control arm 24 has one end 44 pivotally connected to the stanchion 38 at a location between the two ends of that stanchion. The rigid control arm 24 rotates in a vertical plane but is rigid in all other directions. A pitch frame unit 46 is oriented in a horizontal plane and is connected at one end thereof to the top of the stanchion 38 and at another end thereof to the upper end of the roll frame unit 47. A pitch axis P extends through the pitch frame unit at the connection thereof to the stanchion, and a roll axis R extends through the connection between the pitch frame and the roll frame 47. The roll frame 47 is connected to the U-shaped cockpit frame 33 by a yaw connection element 50 as shown in FIG. 5A, and a yaw axis Y extends through this connection. A yaw system 52 is also mounted on the U-shaped cockpit frame 33 as shown in FIG. 2. The yaw system is also connected to the computer whereby yaw movement required by a computer program will be possible using the simulator 10.

As can be understood from FIGS. 8A–10C the user 14 operates the control stick and the yaw system in accordance with the computer program on computer 12, and movement of the control stick and the yaw system are proportionally transferred to the U-shaped cockpit frame unit so that unit moves in the rolling, pitching and yawing motion associated with particular computer software requirements. As can be understood from FIG. 3 the simulator 10 has a center of gravity CG that is located beneath the pitch and roll axis. Therefore, the U-shaped cockpit frame 33 tends to return to its upright orientation after any pitching or rolling movement. This tendency produces a resistance to control stick-initiated pitching and/or rolling which is similar to the resistance that one would expect in flying an airplane.

Figure 4A:
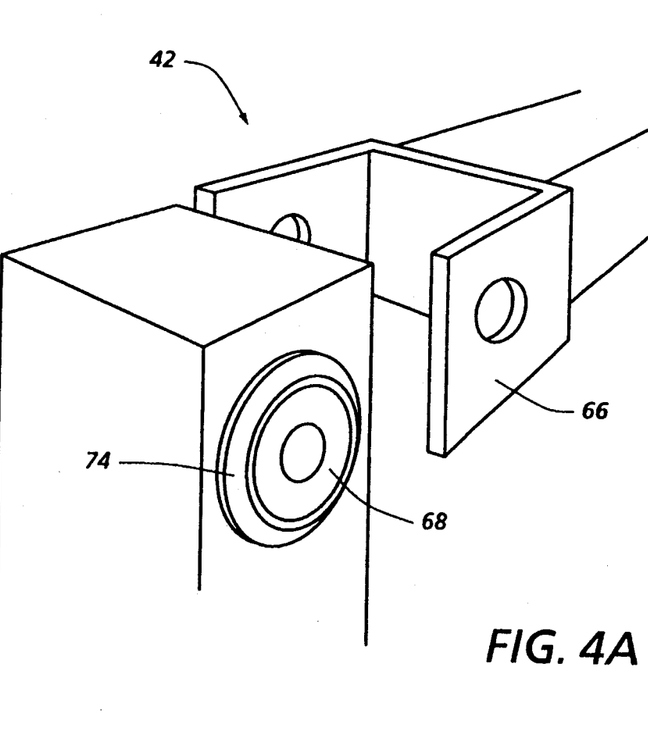
FIGS. 4A and 4B are cutaway views of a bearing connection.
Figure 4B:
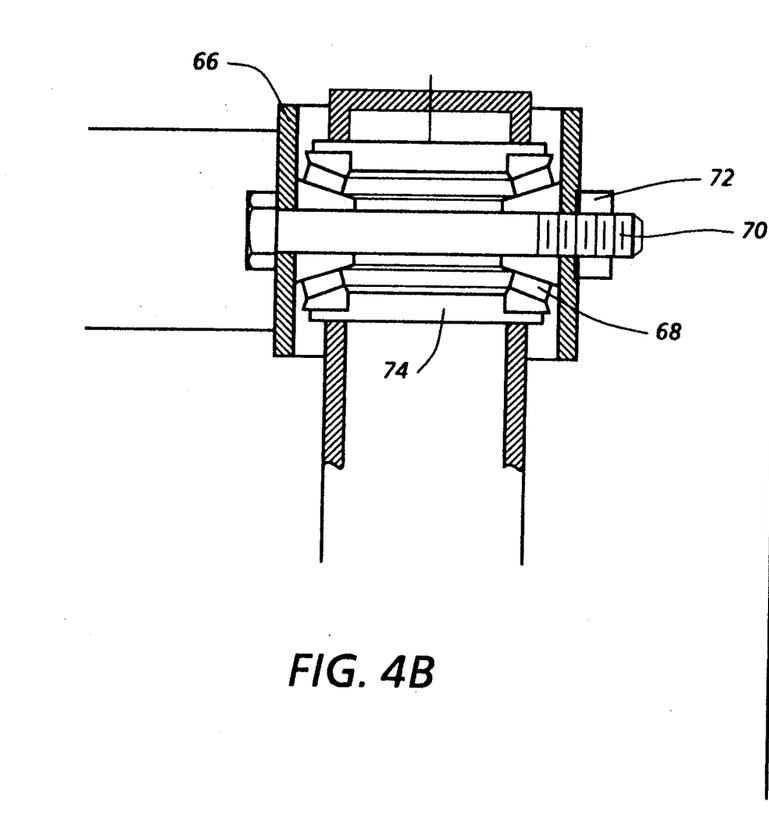

More specifically, referring to FIG. 1 the stanchion 38 is connected to a long leg 54 of an L-shaped pitch frame element 46 which includes a short leg 58. The long leg 54 is connected to the stanchion by a pitch joint 60 and the short leg is connected to the roll frame element 47 by a roll joint 62 shown in FIG. 2. The joints are best shown in FIGS. 4A–4B as including a yoke portion 66 connected to a set of roller bearings 68 by means of a bolt 70 and nut 72. A machined insert 74 carries the bearings for the joint. The roll joint includes identical elements and thus will not be described. The roll joint is shown in FIGS. 5A and 5B.

Figure 9A:
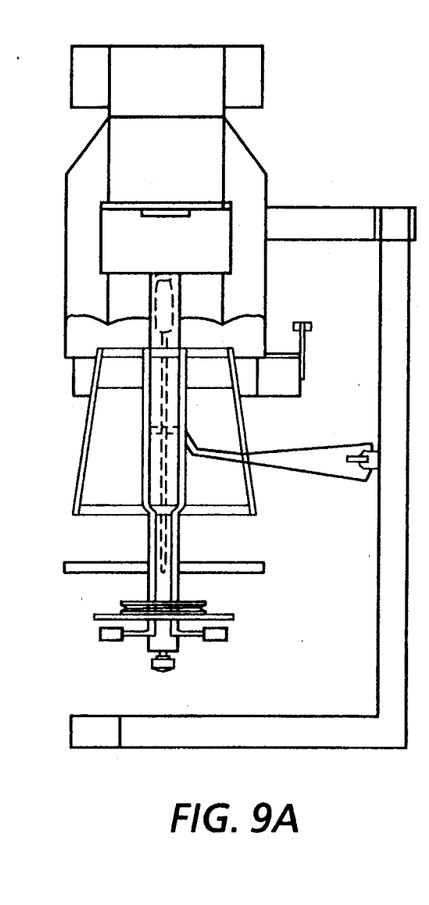
Figure 9B:
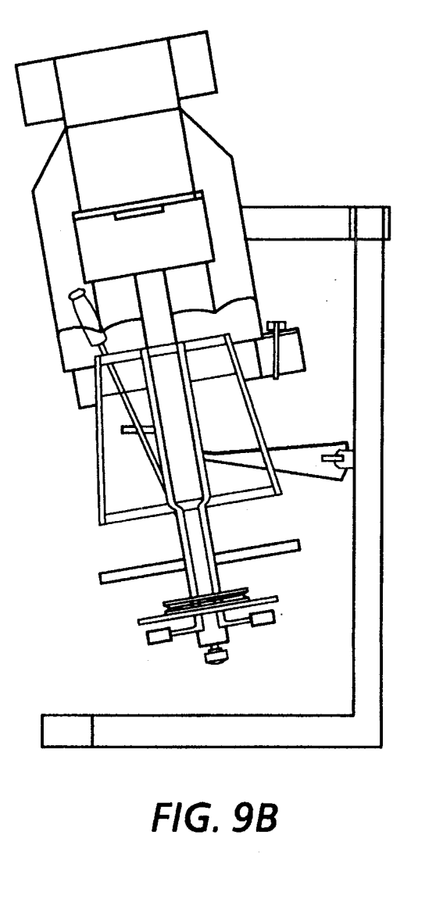
Figure 9C:
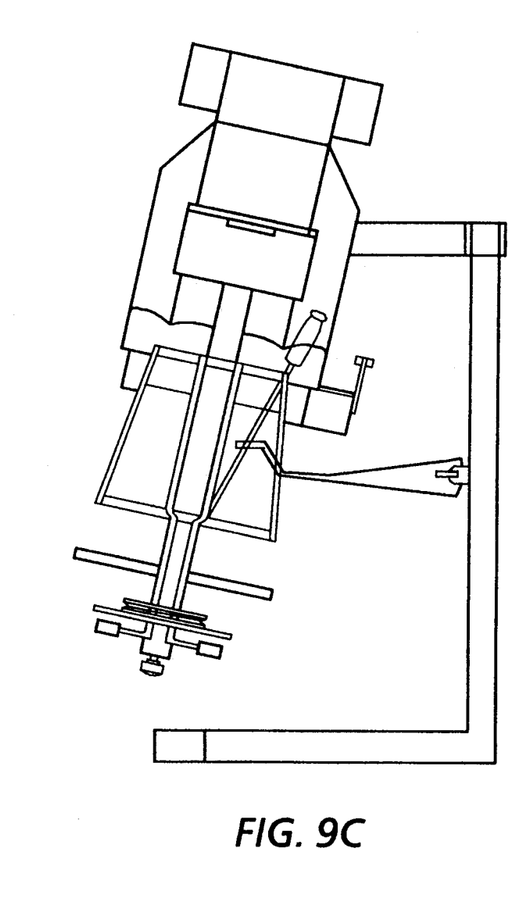

As best shown in FIGS. 1 and 9C the rigid control arm 24 is fixed to the stanchion at end 44 of the rigid control arm, and extends outwardly from that stanchion towards the center of the floor element 2e. A universal joint 80 connects the distal end of the rigid control arm to the top end of the control stick 26 so that 360° movement of the control stick with respect to the rigid control arm can be effected. A J-shaped control section 82 has one end thereof connected to the control stick and has a handgrip 84 on the other end. The handgrip includes control buttons A and B and the like that are commonly used with computer simulation. The J-shaped section is connected to the control stick between the top and bottom ends of the control stick, with the top end acting as a fulcrum of a lever. Thus, the control stick acts as a third class lever with the moving force located between the fulcrum and the resisting weight. Movement of the handgrip causes corresponding movement of the control stick, which causes corresponding movement of the cockpit frame. For example, moving the handgrip toward or away from the computer monitor causes the cockpit to pitch fore end down and vice versa, while movement of the hand grip from side to side causes rolling movement of the cockpit frame. A V-shaped connective element 88 connects the control stick to the electronic joystick so that such movements of the handgrip are input into the computer to be read by the computer program and used to control the vehicle in the computer program. The V-shaped connecting element 88 having each of the ends thereof connected to a bar 90 attached to the control stick and having the apex thereof connected to the electronic joystick operating stick 92. Stick 92 is connected to an input box 94 that is electrically connected to the computer via leads. The computer uses the input from the control box in a manner common to such computer programs.

Figure 6:
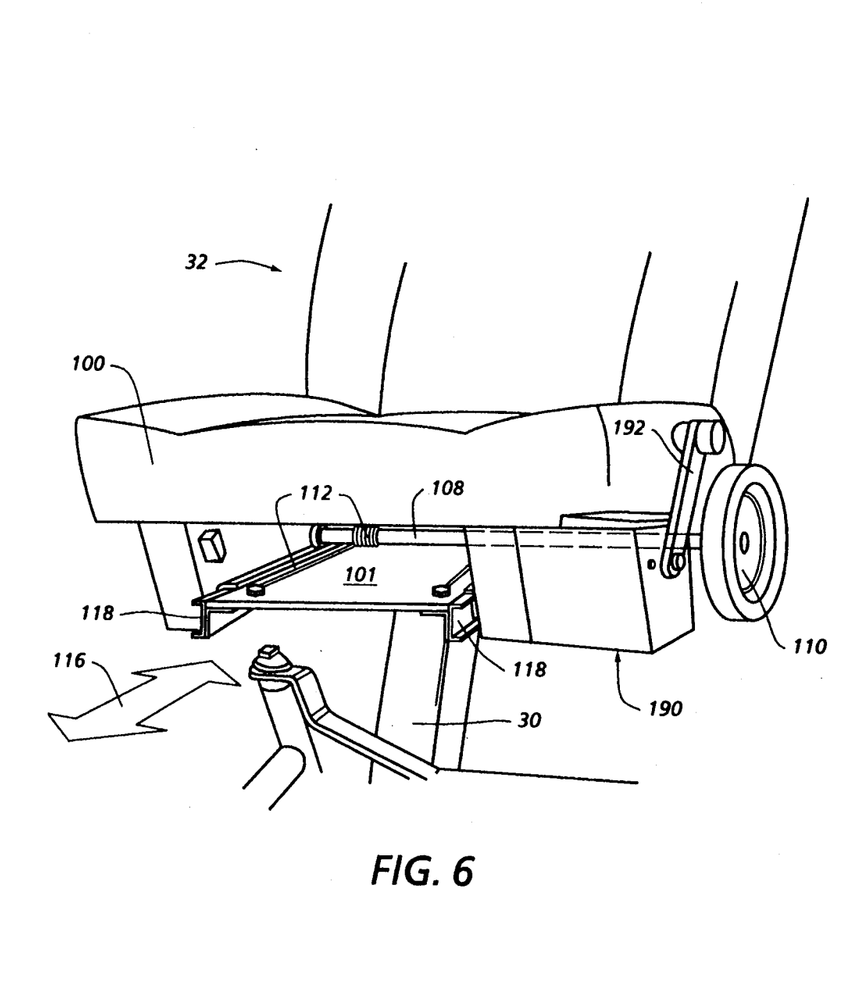
FIG. 6 is a front perspective view of the seat adjustment mechanism that permits fore and aft movement of the seat unit.
Figure 6A:
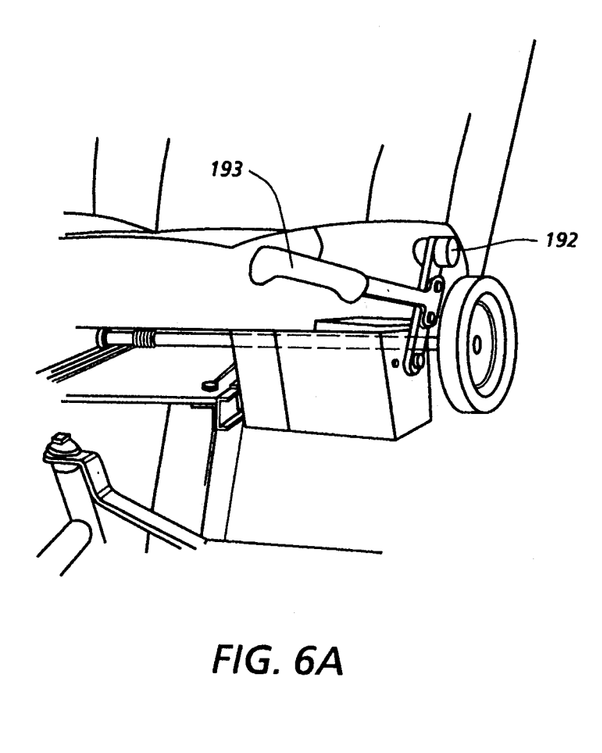
FIG. 6A is a perspective view of an optional helicopter collective pitch lever.

The seat element 32 is best shown in FIGS. 1, 2, 3, 8A–9C and includes a seat base 100 and a seat back 102 and forward extending side pads 103 that contact the user to enhance the effect of motion. The seat base 100 is connected to the seat support frame 30 by a seat platform 101 shown in FIGS. 6 and 6A. Forward or rearward movement of the seat element can be effected to accommodate users of different weight. As shown in FIGS. 6 and 6A this adjusting movement is effected using a trim wheel 110 having a cable 112 connected at one end thereof to the rear of the seat platform 101 and at the other end thereof to the front of the seat platform 101. The cable is wound around axle 108, which is mounted to the seat base 100, and rotation of the axle causes the seat element to move forward or aft as indicated by arrow 116 in FIG. 6. The seat includes seat slides 118 so the seat element can move relative to the seat platform 101 under the influence of the trim axle 108. As best shown in FIG. 2, an optional counterweight system 122 is connected to the seat to adjust to different user weights. The counter weight system includes a weight arm 124 connected at one end thereof to the seat support frame 30 and at the other end thereof having a post 126 to attach weights, such as barbell weights 128 to the arm 124.

Figure 10A:
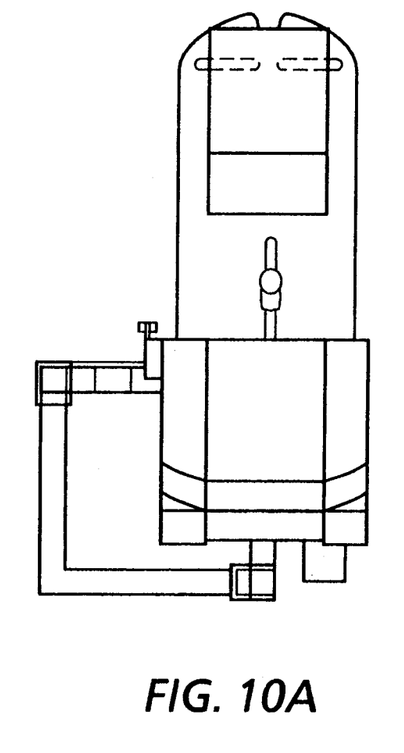
Figure 10B:
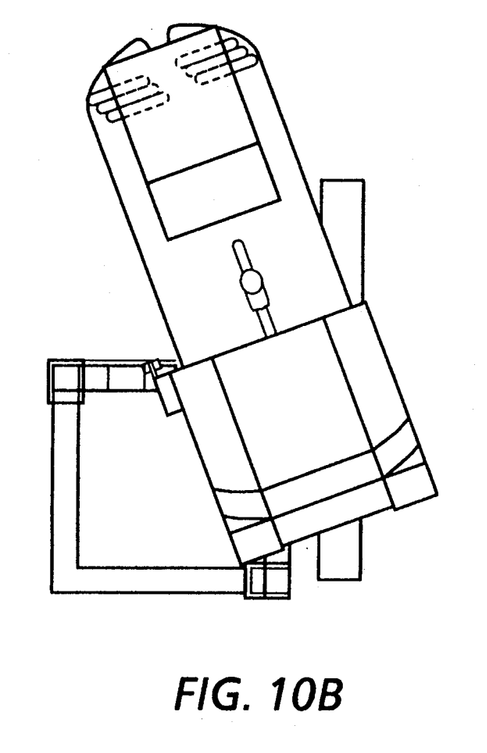
Figure 10C:
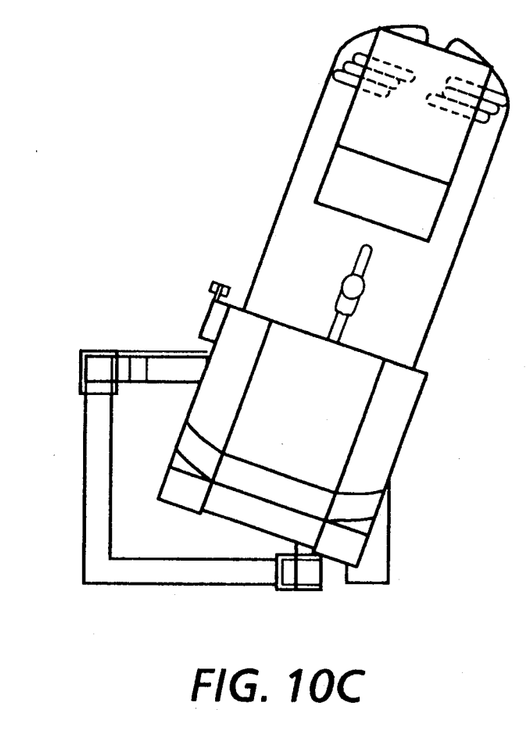

Yawing motion is effected using the yaw system 52 and the yaw connection element 50 best shown in FIGS. 2 and 5-5A. The yaw connection element 50 includes two plates 130 and 131 connected to the U-shaped cockpit frame 33 and to the lower end of the roll frame 47 respectively. Sandwiched between plates 130 and 131 are two ball bearing race turntable plates 134 which house ball bearings therebetween. The yaw connection element permits the U-shaped cockpit frame 33 to swivel with respect to the roll frame 47 so that a yawing movement can be effected for the cockpit frame as shown in FIG. 10A-10C.

Swiveling of the plate 131 with respect to the plate 130 is effected by means of yaw system 52 that is best shown in FIGS. 1, 2, 5 and 5A. The yaw system includes two foot pedals 140 and 142 that are pivotally connected at the top end thereof to the computer monitor platform mounting leg and include foot rests 144 on a bottom end thereof. Connecting links 146 are each connected at one end thereof to each of the foot rests and at the other end thereof to the T-shaped bar top 148. The T-shaped bar has a base 150 that is slidably received in the lower end of the roll frame 47 and is fixed thereto by a screw 152 that forces the bar against the inside surface of the hollow element 47. The bar can be moved forward or rearward with respect to the element 47 to accommodate various users whereby a short user can use the simulator as comfortably as can a tall user. As can be seen, the yaw system foot operated links are third class levers with the fulcrums thereof located at the connection to the computer monitor platform supporting element at one end of the lever, the force being exerted on the lever between the fulcrum and the resisting force that is applied at the crosspiece of the T-bar 148. Pushing on one of the foot rests causes the T-bar to twist thereby causing the plate 131 to swivel with respect to the plate 130 and causing a corresponding yawing movement of the U-shaped cockpit frame. The physical yaw movement is fed into the computer by means of a yaw potentiometer 160, mounted to the underside of the U-shaped cockpit frame 33, best shown in FIGS. 2 and 5. The yaw potentiometer includes a bail 162 connected at one end thereof to a yaw arm 164, mounted to the roll frame 47, and having the other end thereof connected to the potentiometer. Physical movement about the yaw axis is thus translated into electrical signals that are input into the computer and used by the computer program to control a vehicle of that program.

A throttle system 190 is indicated in FIG. 6 and includes a throttle control stick 192 that is connected to a potentiometer, which in turn is connected to the computer program whereby physical movement of the throttle is translated into electrical signals that are input into the computer program to control the speed of the vehicle being shown on the computer screen.

An alternative form of the simulator is shown in FIG. 6A and includes a helicopter collective pitch lever 193 connected to the throttle control stick 192 whereby the feel of a helicopter can be simulated.

Figure 11:
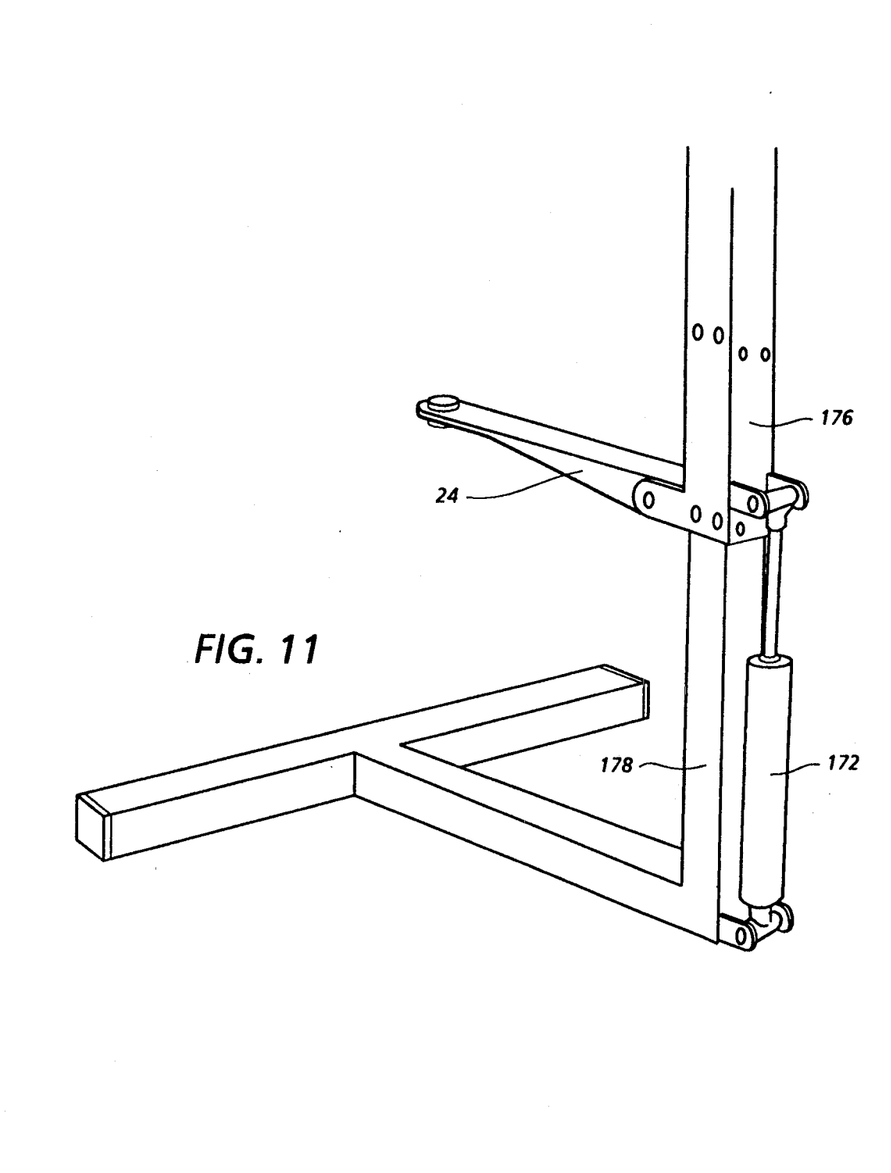
FIG. 11 is rear perspective view of a mechanism for imparting vertical motion to the seat unit to simulate g-forces.
Figure 11A:
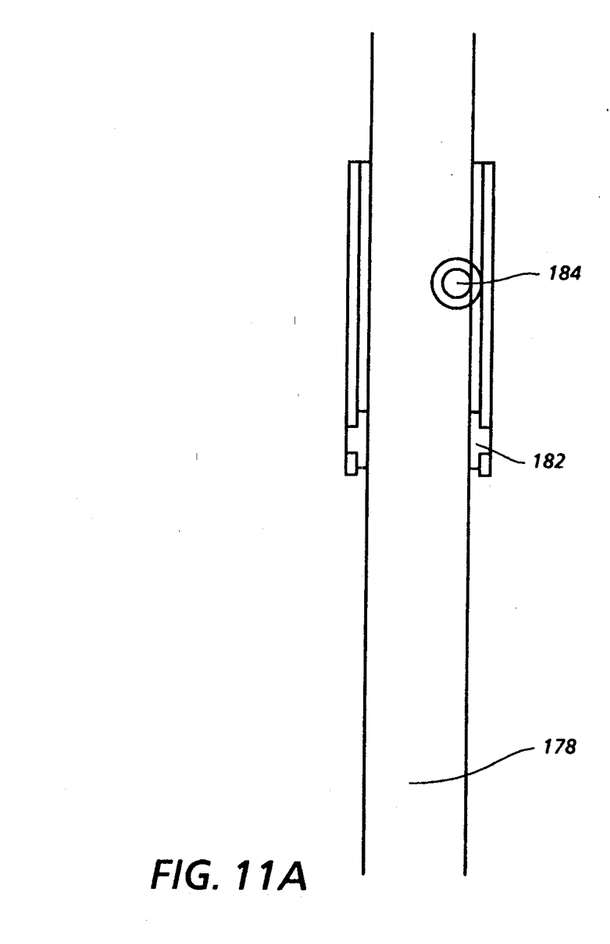
FIG. 11A shows the mechanism shown in FIG. 11.

An alternative form of the simulator includes a system for imparting vertical movement to the cockpit frame. As shown in FIGS. 11-11A, this system includes a linear actuator 172 connected at one end thereof to the base and having the distal end connected to a sleeve 176 to which the rigid control arm 24 is connected. The sleeve is slidably mounted on the post 178 to slide up and down on that post under the influence of the actuator. Rollers, such as roller 182, and bearings, such as bearing 184 facilitate the sliding of the sleeve with respect to the post. The up and down slide motion is controlled by a program in the computer, a microprocessor, or mechanical link connected to the pitch and roll mechanisms whereby g-force can be applied to a user in the cockpit. Upward and downward movement of the sleeve is imparted to the cockpit frame 33 via the pitch 46 and roll 47 frames.

Figure 12:
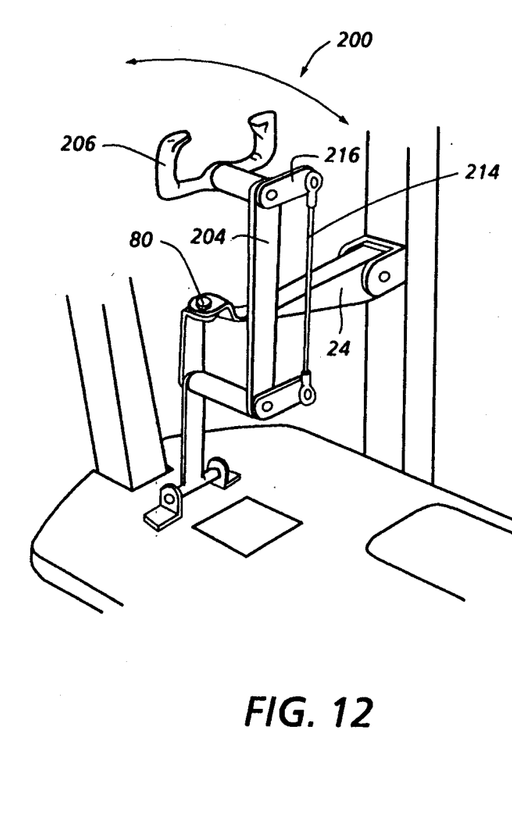
FIGS. 12, 12A and 12B show an optional control yoke.
Figure 12A:
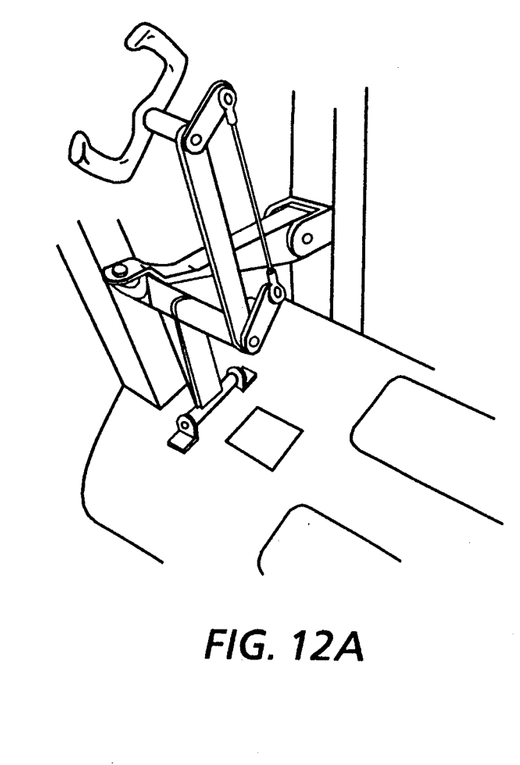
Figure 12B:
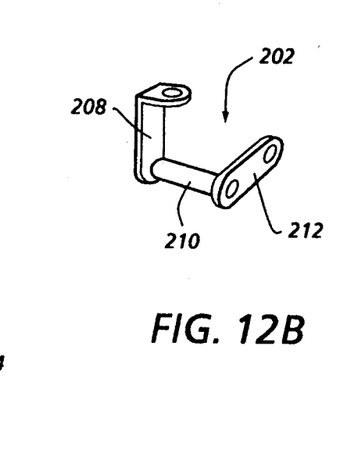

Another alternative form of the simulator includes a control yoke 200 connecting the cockpit frame 33 to the rigid control arm 24 shown in FIGS. 12-12A. The yoke 200 includes a bracket unit 202 connected to a Z-shaped arm 204. The arm 204 has one end connected to the cockpit frame 33 and has a steering element 206 connected to the other end. The bracket unit 202 includes a first bracket 208 connected at one end thereof to a connecting pin 210 and has the other end thereof connected to the rigid control arm by a universal joint 80. A pivot lever 212 is connected to the pin 210 at one end thereof and to a control link 214 at the other end. The control link is connected to a second pivot lever 216. Movement of the steering element 206 causes movement of the control stick with the concomitant movement of the cockpit frame and input into the computer program as above discussed. The potentiometer is not shown for the sake of convenience. An alternative yoke orientation is shown in FIG. 12A.

Figure 7:
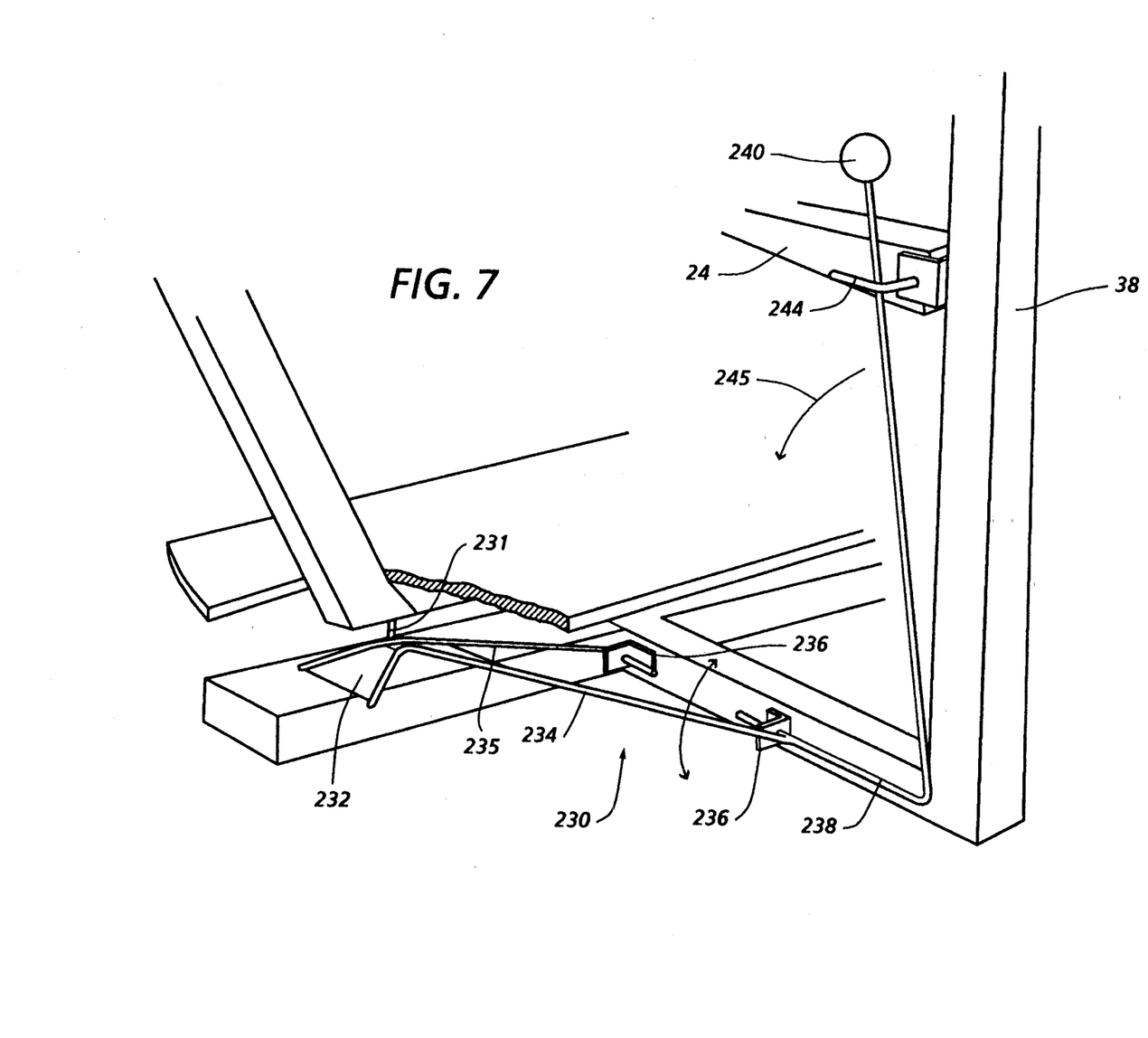
FIG. 7 is a front perspective view of the parking brake mechanism.
Figure 8A:
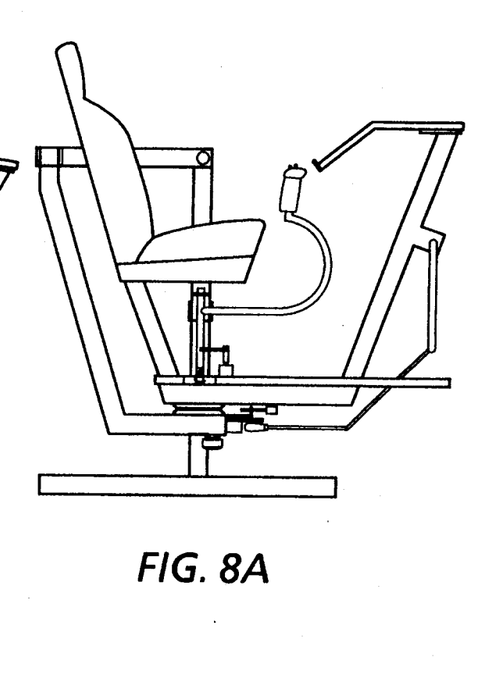
Figure 8B:
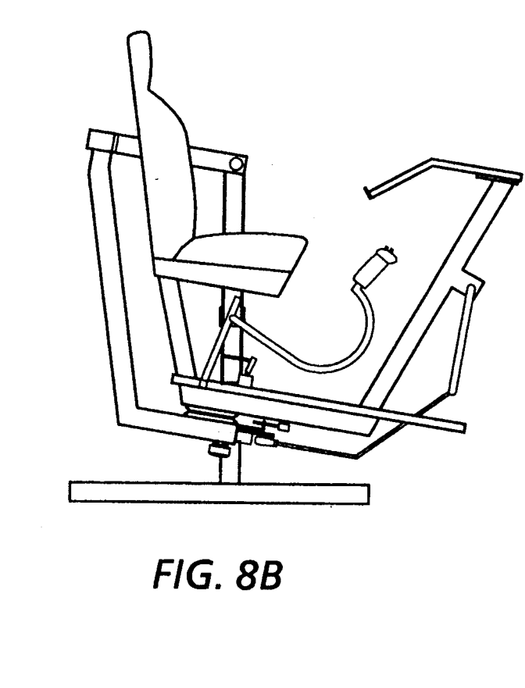
Figure 8C:
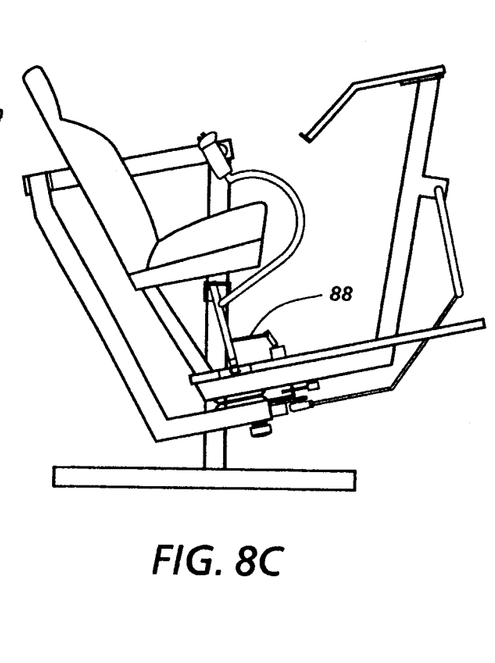

As mentioned above, the cockpit frame unit has multiple degrees of movement. Therefore, it may be difficult for a user to mount or dismount the simulator, especially if that user is a novice. Accordingly, one form of the simulator includes a parking brake unit 230, as shown in FIG. 7. The parking brake unit releasably attaches the cockpit frame unit to the base to hold that cockpit frame unit stationary. The parking brake includes a pin 231 on the bottom of the cockpit frame 33 and a tongue element 232 pivotally attached to the base by legs 234 and 235. The legs are attached to brackets 236 mounted on the base, and leg 234 includes an L-shaped extension portion 238. The portion 238 extends upwardly from the base and includes a knob 240 on the top end thereof. An L-shaped rest 244 is affixed to stantion 38 to hold extension portion 238. The extension 238 and the assembly are attached in a manner such that when the extension portion 238 is engaged with the rest 244, the brake tongue is engaged with the pin 231 on the bottom of the cockpit frame 33. However, when the portion 238 is moved out of engagement with the rest 244 and in direction 245 forward of the vertical stanchion 38, the tongue will slide out of engagement with the pin 231 and will release the cockpit frame 33. The tongue will fall to the floor and will remain out of the way until parking is desired. At that time, the seat is positioned above the tongue, and the handle 238 pulled back to lift the tongue upwardly and into engagement with the pin.

As shown in FIG. 1A, pitch shock absorber 252 connects the pitch frame to the stanchion and roll shock absorber 254 connects the pitch frame to the roll frame to eliminate free swinging feel of pitch and roll.

Modifications include the above discussed g-force simulator, a helicopter collective lever, a control yoke, parking brake, and shock absorbers.

The various vehicles that can be simulated are: automobile, fixed wing aircraft, helicopter, space craft, glider, robot, tank, motorcycle, submarine, and boat. However, it is to be understood that this list is intended to be an example and is not intended as exclusive of other vehicles and simulations that can be effected using the simulator 10. While certain forms of the present invention have been illustrated and described herein, it is not to be limited to the specific forms or arrangements of parts described and shown.

We claim:

1. A motion simulator for use with an existing personal computer and off the shelf software comprising:
   A) a main frame unit that includes
      (1) a base unit,
      (2) an upright stanchion attached at one end thereof to the base unit and having a second end located above said base unit;
   B) an L-shaped pitch frame arm having a long leg and a short leg, a pitch pivot joint attaching said long leg to said second end, a roll pivot joint attached to said short leg, said pitch frame arm being located in a plane spaced above said base and including,
      (1) a pitch axis extending through said pitch pivot joint, and
      (2) a roll axis extending through said roll pivot joint;
   C) an L-shaped roll frame having a long leg connected at a top end thereof to said roll pivot joint and extending toward said base unit, and a short leg located above said base unit;
   D) a yaw connection element mounted on said roll frame short leg and having a yaw axis extending therethrough;
   E) a U-shaped cockpit frame element having a plate thereof mounted on said yaw connection element, a first leg connected at one end thereof to said plate and another end thereof spaced above said plate, and a second leg having one end thereof connected to said plate and having a second end spaced above said plate;
   F) a seat platform mounted on said cockpit frame first leg;
   G) a seat unit having a seat base and a back connected to said seat base, said seat base being mounted on said seat platform;
   H) a monitor support platform mounted on said cockpit frame second leg;
   I) a keyboard support platform mounted on the edge of said monitor support platform;
   J) a rigid control arm connected at a proximal end thereof to said stanchion and having a distal end thereof spaced from said support stanchion above said base unit;
   K) a control stick connected at one end thereof to said U-shaped cockpit frame above the U-shaped cockpit frame plate and having a second end thereof connected to said rigid control arm distal end, a first universal joint connecting said control stick to said rigid control arm beneath said seat platform and above said base unit, a second universal joint connecting said control stick to said cockpit frame, said rigid arm being stationary whereby movement of said control stick causes proportional movement of said cockpit frame unit with respect to said rigid arm;
   L) a center of gravity of said cockpit frame unit being located beneath said pitch and roll axis;
   M) self centering of said U-shaped cockpit frame caused by the location of said center of gravity;
   N) feedback feel caused by said self centering; and
   O) a one quarter gimbal construction to allow simple user access.

2. The motion simulator defined in claim 1 further including means for translating physical movement of said control stick to electrical signals and input those electrical signals into a computer.

3. The motion simulator defined in claim 2 further including a J-shaped portion attached to said control stick.

4. The motion simulator defined in claim 1 further including yaw means for moving said U-shaped cockpit frame in a yaw plane, said yaw means including foot pedals pivotally mounted on said U-shaped cockpit frame second leg and connected to said roll frame.

5. The motion simulator defined in claim 4 further including means for translating physical yaw movement into electrical signals and input said yaw movement electrical signals into the computer.

6. The motion simulator defined in claim 5 further including a throttle element electrically connected to the computer.

7. The motion simulator defined in claim 6 further including trim means on said seat for moving said seat fore and aft, whereby moving said center of gravity, in relation to said cockpit frame to accomplish pitch down or pitch up positions of said cockpit frame respectively.

8. The motion simulator defined in claim 7 further including means on said cockpit frame and connected to said control stick to proportionally pitch and roll said cockpit frame in response to movement of said control stick.

9. The motion simulator defined in claim 8 further including a counterbalance means on said seat.

10. The motion simulator defined in claim 9 wherein said counterbalance means includes an arm connected to said seat and having a distal end on which weights are positioned.

11. The motion simulator defined in claim 10 wherein said seat frame unit includes sides that extend forward from said seat back.

12. The motion simulator defined in claim 1 further including a parking mechanism connected to said base and having means for releasably connecting said cockpit frame unit to said base.

13. The motion simulator defined in claim 12 further including means for adjusting fore and aft position of said seat unit in relation to said cockpit frame.

14. The motion simulator defined in claim 1 wherein said roll joint and said pitch joint each includes a bearing means, a yoke and a fastener.

15. The motion simulator defined in claim 2 wherein said means for translating physical movement of said control stick to electrical signals and input those electrical signals into a computer includes a bail connected to said control stick and to an electronic joystick.

16. The motion simulator defined in claim 15 means for translating physical movement of said control stick to electrical signals and input those electrical signals into a computer includes a potentiometer.

17. The motion simulator defined in claim 1 further including means for moving said rigid control arm vertically upward and downward relative to said base unit.

18. The motion simulator defined in claim 4 wherein said yaw means includes a T-shaped bar having a body connected to said roll frame and a top connected to said body and elements connecting said foot pedals to said T-shaped bar top.

19. The motion simulator defined in claim 4 further including shock absorbers on said pitch frame and on said roll frame for damping roll and pitch.

* * * * *